L. F. BULLÔT.
PROCESS OF PRESERVING MEAT AND ALIMENTARY SUBSTANCES.
APPLICATION FILED SEPT. 23, 1918.
1,398,836.
Patented Nov. 29, 1921.
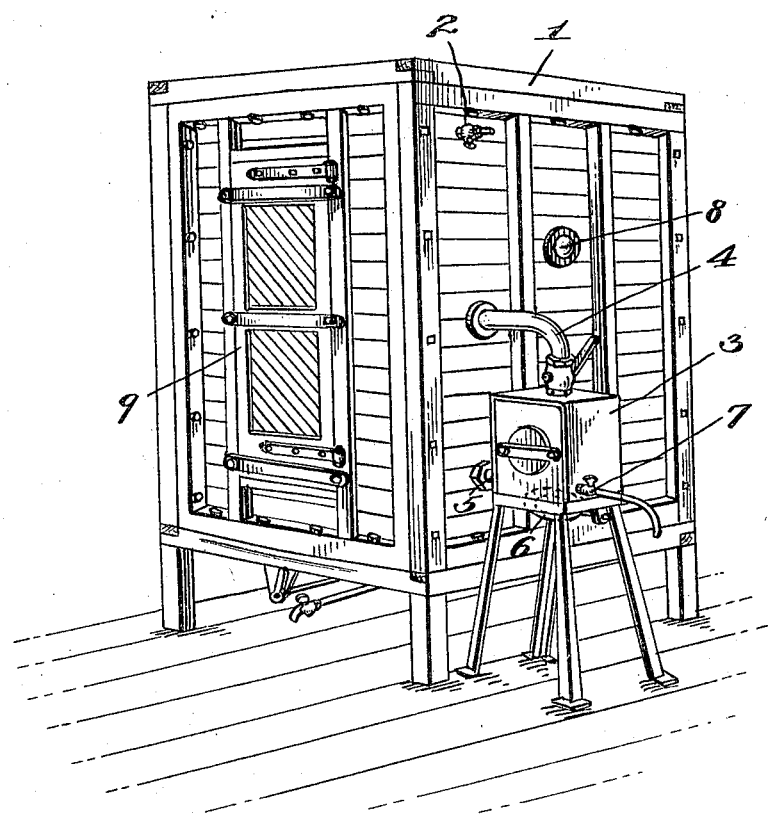

UNITED STATES PATENT OFFICE.

LOUIS FREDERICK BULLÔT, OF SYDNEY, NEW SOUTH WALES, AUSTRALIA.

PROCESS OF PRESERVING MEAT AND ALIMENTARY SUBSTANCES.

1,398,836. Specification of Letters Patent. Patented Nov. 29, 1921.

Application filed September 23, 1918. Serial No. 255,300.

*To all whom it may concern:*

Be it known that I, LOUIS FREDERICK BULLÔT, a subject of the King of Great Britain, residing at Sydney, in the State of New South Wales, Commonwealth of Australia, have invented certain new and useful Improvements in Processes of Preserving Meat and Alimentary Substances, of which the following is a specification.

This invention relates to improvements in the process of preserving meat and other alimentary substances which are subject to the action of putrefactive bacteria and is a development of the invention described in my prior Patent No. 1,119,398, in which the substances are contained in a closed vessel and subjected to fumes generated in said vessel.

According to the present invention the fumigating mixture or charge is placed in a separate vessel or combustion chamber and fumes are generated therefrom on the external application of heat from a suitable burner thereby avoiding an undue increase of temperature in the treatment chamber. This combustion chamber communicates by a pipe, controlled by a valve, with the treatment chamber into which the fumes pass and circulate around the substances to be treated. The treatment chamber is provided with an outlet or outlets at or adjacent to the top for the initial circulation of air which outlets are closed immediately any fumes pass therethrough. At or about the bottom of the treatment chamber a pipe leads therefrom to the floor level of the combustion chamber for the purpose of supplying air to the burning mixture so long as any free oxygen remains in the treatment chamber. After combustion of the fumigating mixture which is usually completed in about twenty minutes the meat or other substances are retained under the influence of the fumes for from 4 to 24 hours according to the particular kind of alimentary substance and its thickness. More oxygen for combustion may be required than is contained within the treatment chamber in which event I provide a cylinder of air or oxygen under pressure and connect it by a valve controlled pipe with the combustion chamber in order to supply the necessary oxygen.

A pressure gage may be provided on the treatment chamber which is fitted with an air tight door or doors and suitable peep holes.

Any suitable apparatus may be used in the practice of this invention but for purposes of illustration reference may be had to the accompanying drawing which represents a perspective view of an embodiment of the apparatus covered by Letters Patent No. 1,320,988, issued to me under date of November 4, 1919, wherein:

1 represents the treatment chamber, 2 designates the air outlet valve, 3 designates the combustion chamber, 4 a pipe connecting the combustion chamber to the treatment chamber, 5 a pipe connecting the treatment chamber with the combustion chamber and through which the air is drawn from the treatment chamber, 6 a burner for supplying heat to the combustion chamber, 7 a valved pipe provided for the purpose of supplying oxygen to the combustion chamber, 8 openings through which the interior of the treatment chamber may be observed, and the door in the treatment chamber through which the materials to be treated may be inserted or removed is designated as 9.

In carrying out the treatment the alimentary substances, which are preferably covered with stockinette or like fabric, are suspended in the treatment chamber and the door closed so as to be air tight. The fumigating mixture is then placed in the combustion chamber and after the valves on the pipes communicating with the two chambers at top and bottom are opened, is ignited by the application of heat from a suitable external burner.

The mixture is preferably composed of vegetable charcoal 8 parts, golden wattle bark 4 parts, saltpeter 2 parts and sulfur 4 parts together with a small proportion of oil of eucalyptus and oil of cinnamon and on being heated quickly gives off fumes. These fumes pass from the combustion chamber through the upper pipe to the treatment chamber and the air in the latter passes out or is drawn through the lower pipe to the combustion chamber. When the fumes pass out through small outlets at the top of the treatment chamber they are closed.

When the generation of the fumes has ceased the valves controlling the communicating pipes may be closed and the substances are then allowed to remain under the influence of the fumes from 4 to 24 hours according to their nature.

In practice I find that if on viewing through the peep holes the density of the fumes is sufficient to obscure the substances within the treatment chamber, the pressure is ample.

Having thus described my invention what I claim as new and desire to protect by Letters Patent, is:—

The herein described method of preserving meat and other alimentary substances, consisting in inclosing the substance in a treatment chamber, and burning a mixture of charcoal, golden wattle bark, saltpeter, sulfur and preserving and flavoring oils in a separate combustion chamber and charging the treatment chamber with fumes of the mixture to the proper density and hermetically sealing said treatment chamber and permitting the substance to remain inclosed and affected by the fumes for a predetermined time.

In testimony whereof I have hereunto set my hand.

LOUIS FREDERICK BULLÔT.